June 13, 1967  H. ERDELITSCH ETAL  3,325,784
COMBINED FLARE AND TURN SIGNAL ARRANGEMENT
FOR AUTOMOTIVE VEHICLES
Filed Feb. 1, 1965  4 Sheets-Sheet 4

Inventors
HERBERT ERDELITSCH
ERWIN JANOL

McClew & Toren
ATTORNEYS.

ant Office 3,325,784
Patented June 13, 1967

3,325,784
COMBINED FLARE AND TURN SIGNAL ARRANGEMENT FOR AUTOMOTIVE VEHICLES
Herbert Erdelitsch and Erwin Jandl, Bietigheim, Wurttemberg, Germany, assignors to SWF—Spezialfabrik für Autozubehör Gustav Rau GmbH., Bietigheim, Wurttemberg, Germany
Filed Feb. 1, 1965, Ser. No. 429,267
Claims priority, application Germany, Feb. 14, 1964, S 89,495
10 Claims. (Cl. 340—74)

This invention relates to visual signaling systems for automotive vehicles and, more particularly, to a novel combined turn signaling and "emergency stop" or "flare" signaling system for automotive vehicles.

As is known to those skilled in the art, turn signaling systems for automotive vehicles generally include a flasher, connected to the vehicle carried source of electric potential, such as a battery, generator or alternator, a turn signal selector switch connected to the flasher, and right and left turn signal lamps mounted on respective opposite sides of the vehicle and selectively energized by operation of the turn signal selector switch. It is also known to provide emergency stop or "flare" warning signaling systems for vehicles by means of which most or all of the signal or marker lights on the vehicle may be flashed, either in synchronism or in alternation, to indicate an emergency stop. In some arrangements of both types, particularly on passenger vehicles, the already existing signal or marker lamps, such as the brake or stop lamps and the parking lamps, may be additionally used either to signal a turn or to signal an emergency stop, as by operation of a "flare" switch, in the latter case.

In a known flare signaling arrangement combined with a turn signaling arrangement, the circuit connections between the turn signal selector switch and the signal lamps are interrupted by a flare signal switch interposed between the turn signal selector switch and the signal lamps. Normally, this flare signal switch connects the turn signal selector switch to the signal lamps. However, when the vehicle makes an emergency stop, or is parked for an emergency, the flare signal switch is operated to the "on" position in which it disconnects the turn signal selector switch from the signal lamps and connects the signal lamps directly to the flasher. While, with the arrangement in which the connection between the turn signal selector switch and the signal lamps is interrupted by the flare switch, it is possible to give, in addition to the flare or emergency stop signal, a turn signal for the vehicle, this arrangement has the disadvantage that the flasher will be destroyed in a short time in continuous operation when flashing the signal lamps for an emergency stop or flare warning.

One expedient used to obviate the possibility of burning out or destroying of the flasher, under continuous operation during flare signaling, has been to provide an additional flasher used solely during the flare signaling. However, this particular arrangement has not been commercially successful because of the quite considerable additional expense involved in providing the additional wiring and the additional flasher.

Both in flare signal systems and in combined turn and flare signal systems, it is known to provide switch means in the system whereby the flare signal system may be operated only when the vehicle is halted or parked. Thus, misuse of the flare signal system is prevented. Such switching means can be coupled with the tachometer or speedometer shaft, the hand or parking brake, the ignition switch, or other suitable vehicle control elements.

An object of the present invention is to provide a flare signal system for automotive vehicles free of the disadvantages of prior art systems and using, for flashing the lamps as flare signals, the same flasher as used for flashing turn signals.

Another object of the invention is to provide a flare or warning signal system for automotive vehicles, utilizing the flasher normally used for turn signaling, and providing alternate flashing of the stop lamps.

A further object of the invention is to provide a flare or emergency warning signal system for automotive vehicles in which, using the flasher normally used for turn signaling, all or part of the signal lamp equipment of the automotive vehicle is flashed in synchronism without overloading of the flasher.

Yet another object of the invention is to provide a combined turn signaling and an emergency stop signaling system for automotive vehicles including a flare signal switch interposed between the flasher and the turn signal selector switch.

Still another object of the invention is to provide a combined turn signaling and emergency stop signaling, or flare signaling, system for automotive vehicles utilizing the stop lamps flashed in alternation, and utilizing, for flare signaling, the flasher normally used for turn signaling, and in which the stop or brake lamp switch is provided with individual contacts each associated with a respective brake lamp.

A further object of the invention is to provide a combined turn, stop and emergency signaling system for automotive vehicles utilizing the brake or stop lamps for turn signaling and as flare signals, and in which the brake pedal operated switch for the stop lamps controls the latter through an interposed relay.

Still a further object of the invention is to provide an automotive vehicle arrangement of the type mentioned in which a relay is operated by the flasher through a flare switch in the "on" position, and this relay controls current flow to some or all of the signal lamps comprising the vehicle equipment.

Yet another object of the invention is to provide a combined turn and flare signal system for automotive vehicles, using a single flasher for both types of signalling, and in which the load on the flasher during flare signalling is substantially equal to that during turn signalling.

An ancillary object of the invention is to provide an automotive vehicle signalling system of the mentioned type including switching means interposed in the system and effective to prevent operation of the flare signalling arrangement except when the vehicle is halted or parked.

For an understanding of the principles of the invention, reference is made to the following description of typical embodiments thereof as illustrated in the accompanying drawings.

Figure 3:
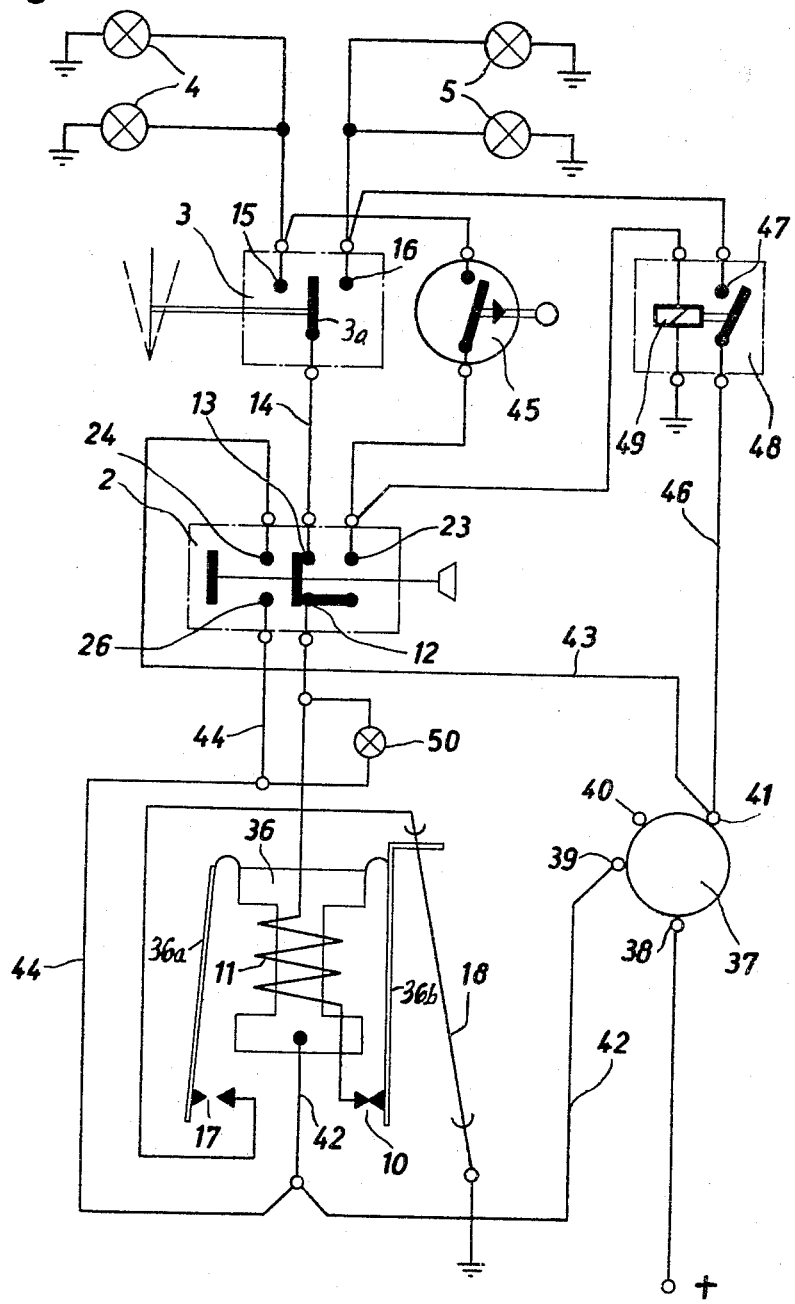
Figure 4:
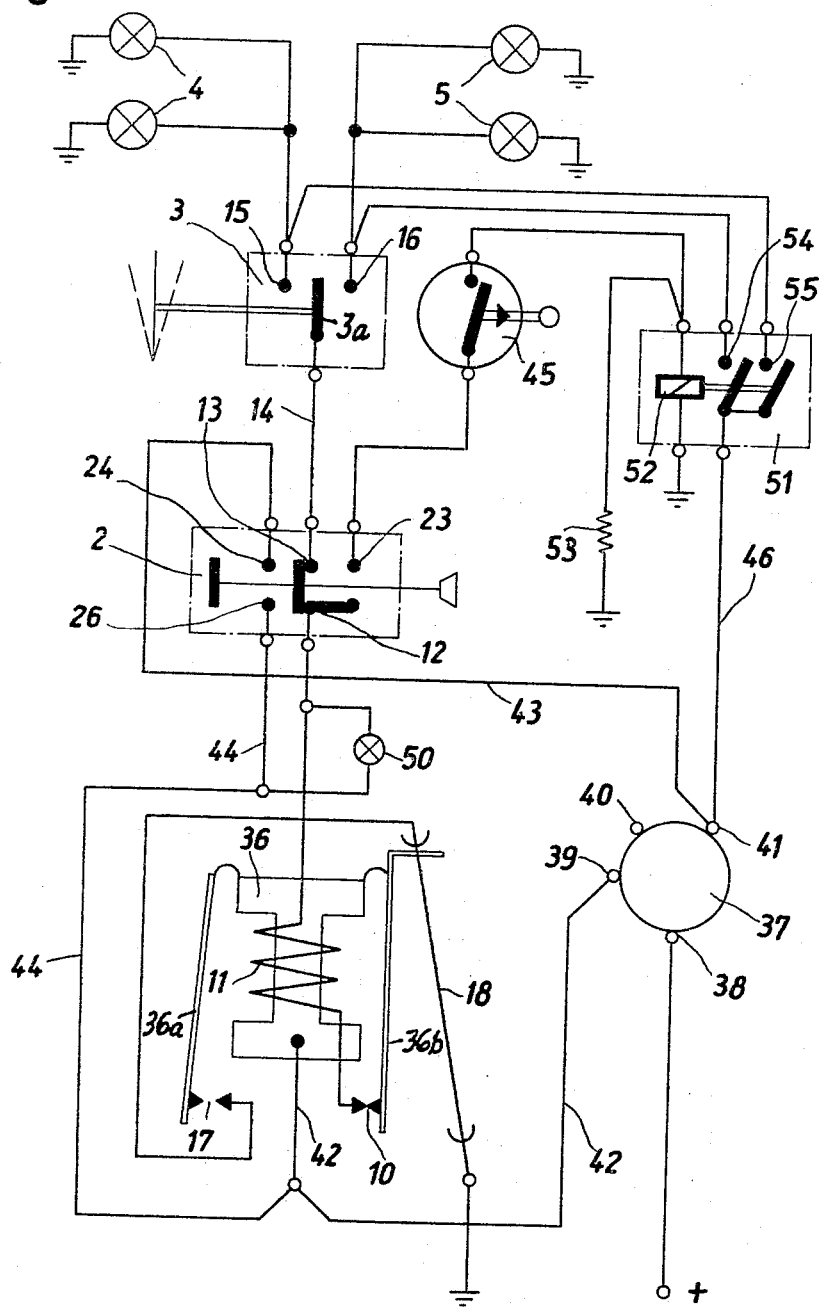

FIG. 3 is a schematic wiring diagram of another embodiment of automotive vehicle signaling system in accordance with the invention and incorporating a switch, closed only when the vehicle is parked, and a relay having a single "make" contact; and FIG. 4 is a schematic wiring diagram of a modification of the automotive vehicle signaling system shown in FIG. 3, and including a relay having a pair of "make" contacts.

Figure 1:
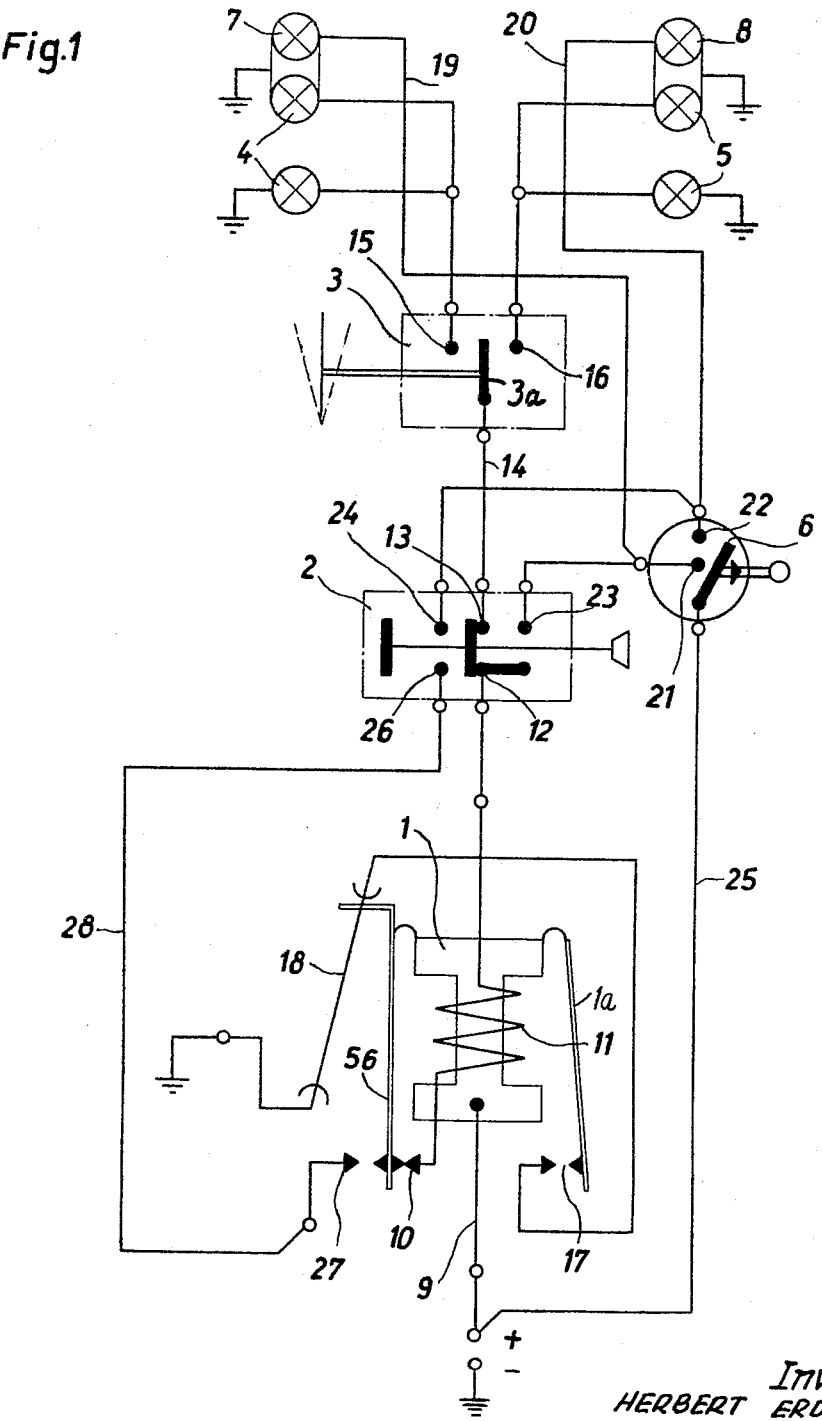
FIG. 1 is a schematic wiring diagram of an automotive vehicle signalling system, embodying the invention, and including an oscillating type of flasher and a brake operated stop lamp switch having separate "make" contacts for each stop lamp.

Referring first to FIG. 1, the automotive vehicle signaling system shown therein includes an oscillating flasher 1, a flare signal switch 2, and a turn signal selector switch 3. The vehicle is equipped with grounded left turn signal lamps 4 and with grounded right turn signal lamps 5, mounted on respective opposite sides of the vehicle. Grounded stop lamps 7 and 8 are provided and are preferably combined in common housings, each with one of the lamps 4 and 5. A stop lamp switch, operated by the usual vehicle foot brake, is provided normally to energize stop lamps 7 and 8, in common, when the foot brake pedal is depressed.

Solely by way of example, the flasher 1 is a combined magnetic and thermal flasher, including a magnetizing winding 11 mounted upon the magnetic core of the flasher 1, and a high resistance thermally expansible hot wire 18. However, any suitable type of flasher may be used. A conductor 9 connects the magnetic core of flasher 1 to the positive terminal of a suitable source of electric potential, such as the vehicle carried battery and generator or alternator. An oscillating switch arm 56 is electrically connected to the core of flasher 1 and is normally engaged with a contact 10 connected to one end of winding 11. The other end of winding 11 is connected to input terminal or contact 12 of flare switch 2 which, in its "off" position, connects terminal 12 to terminal or contact 13. The latter is connected, through a conductor 14, to the input terminal or contact of turn signal selector switch 3.

This turn signal selector switch includes a movable circuit closure 3a selectively engageable with either of a pair of output terminals or contacts 15 or 16. Contact 15 is electrically connected to turn signal lamps 4, and contact 16 is electrically connected to turn signal lamps 5. The opposite terminal of the source of potential is grounded, thereby to complete the circuit.

An armature 1a is associated with flasher 1 and, when winding 11 is energized, armature 1a closes contacts 17 to complete a circuit from conductor 9 through the core of flasher 1 to the high electrical resistance wire, or "hot wire" 18. The resulting current flow through hot wire 18 expands this wire and movable switch arm 56 snaps out of engagement with contact 10 and engages contact 27. A conductor 28 connects contact 27 to an input terminal or contact 26 of flare switch 2.

Conductors 19 and 20 connect the ungrounded terminals of stop lamps 7 and 8 to contacts 21 and 22, respectively, of brake operated switch 6, contacts 21 and 22 being insulated from each other. Flare switch 2 includes output terminals or contacts 23 and 24 which are connected, respectively, to contacts 21 and 22 of brake switch 6. In the "on" position of flare switch 2, input terminal or contact 26 is connected to contact 24, and input terminal or contact 12 is connected to contact 23 and is disconnected from output terminal or contact 13.

In the normal position of the system illustrated in FIG. 1, if the vehicle foot brake is applied, switch 6 closes to connect conductor 25 to contacts 21 and 22 and thus concurrently to steadily illuminate stop lamps 7 and 8. If a turn is to be signaled, turn signal selector switch arm 3a is moved either to the left or the right to connect conductor 14 either to terminal 15 or to terminal 16. This energizes either left stop signal lamps 4 or right signal lamps 5, from the source of potential through flasher 1. As the flasher is thus energized, current flows from the positive terminal of the source through conductor 9, the core of flasher 1, switch arm 56, contact 10, winding 11, contacts 12 and 13, conductor 14, and turn signal switch arm 3a to either contact 15 or contact 16 to energize either lamps 4 or lamps 5 depending upon which direction the turn signal selector switch arm 3a is operated. Current also flows from the positive terminal of the source through conductor 9 to the core of flasher 1 and thus through flasher armature 1a which, due to energization of winding 11, closes contacts 17 so as to provide a current flow through hot wire 18. As the latter heats and expands, switch arm 56 snaps out of engagement with contact 10 and engages contact 27, thereby interrupting the energizing circuit for signal lamps 4 and 5. The signal lamps on a selected side of the vehicle are thus flashed on and off.

Should it be desired to signal an emergency, as when the vehicle is parked for repairs or the like, flare signal switch 2 is moved to its "on" position in which contact 26 is connected to contact 24 and contact 12 is connected to contact 23. In this case, stop lamps 7 and 8 start flashing in alternation depending upon the frequency of the flasher. Initially, stop lamp 7 is connected to the positive terminal of the battery through conductor 9, the core of flasher 1, movable switch arm 56, contact 10, winding 11, contact 12, contact 23, contact 21, and line 19. As switch arm 56 disengages contact 10 and engages contact 23, upon the aforementioned expansion of hot wire 18, stop lamp 8 is energized as follows: positive terminal of source, conductor 9, core of flasher 1, switch arm 56, contact 27, conductor 28, contacts 26 and 24, contact 22, conductor 20, lamp 8, and ground. Thus, at any given instant, only one lamp 7 or 8 is drawing current through flasher 1, thereby avoiding overloading of the flasher. As contact 13 is effectively disconnected from contact 12, in the "on" position of flare signal switch 2, turn signal selector switch 3 is ineffective. The arrangement of FIG. 1 is particularly designed for use as "O.E.M." equipment, to be installed at the factory during manufacture of the automotive vehicle.

Figure 2:
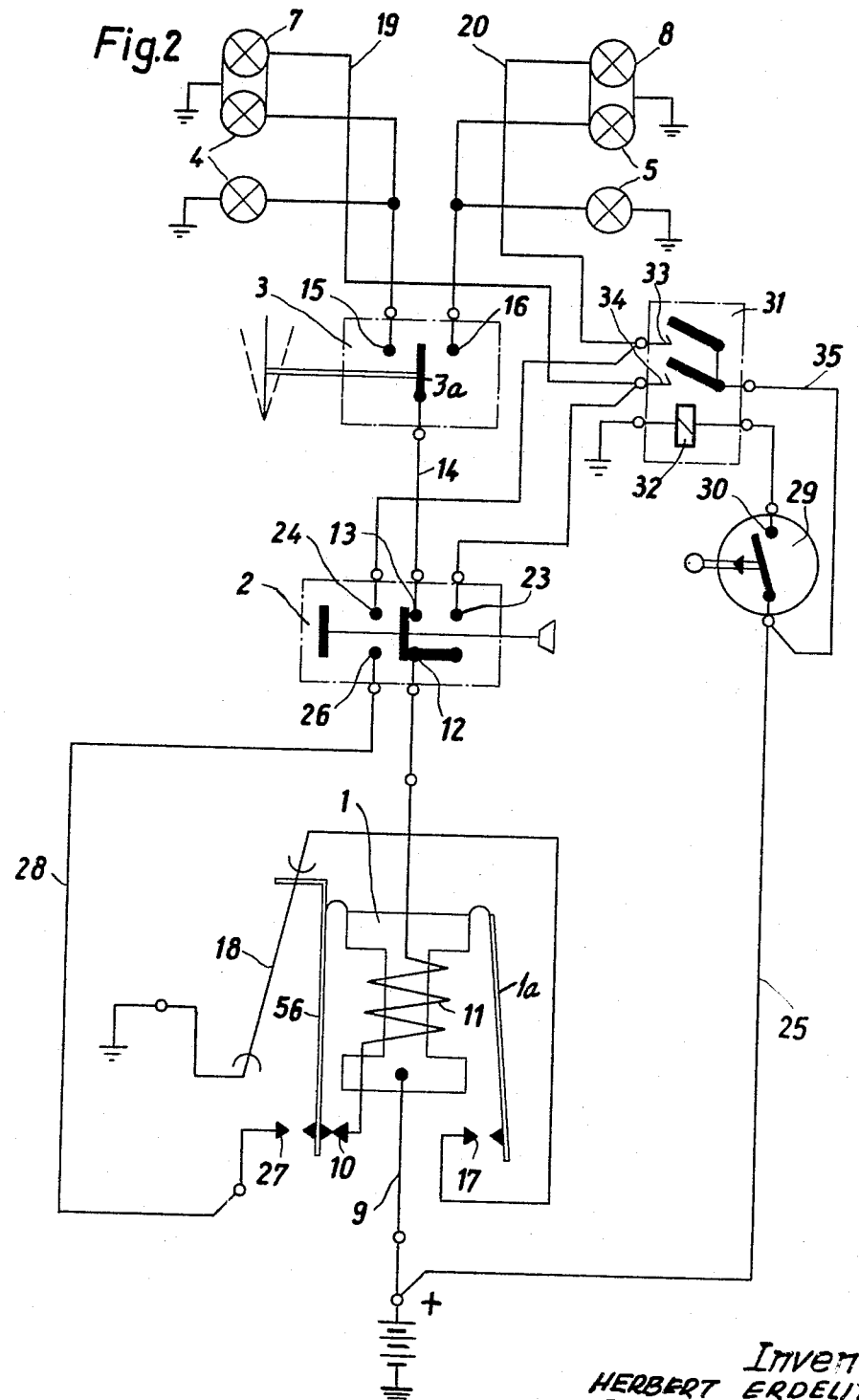
FIG. 2 is a schematic wiring diagram of a modification of the automotive vehicle signalling system illustrated in FIG. 1, and including a double contact relay controlled by a brake operated stop lamp switch having a single "make" contact.

FIG. 2 illustrates a modification of the signaling system of FIG. 1, and which modification is particularly designed for "after" installation in an automotive vehicle. Thus, the system of FIG. 2 uses a standard brake operated switch 29 having a single "make" contact 30. In association with switch 29, there is a relay 31 having an operating winding 32 connected between contact 30, of switch 29, and ground. Relay 31 has a pair of separate armatures adapted to engage respective "make" contacts 33 and 34. These armatures are connected by a conductor 35 to conductor 25 which is, in turn, connected to the positive or ungrounded terminal of the source. Contact 33 is connected to stop or brake lamp 8 through conductor 20, and contact 34 is connected to stop or brake lamp 7 through line 19. Contact 34 is also connected to contact 23 of flare switch 2, and contact 33 is connected to contact 24 of flare switch 2.

In the normal operation of the vehicle, when the brake foot pedal is depressed, switch 29 closes contact 30 to energize coil 32 of relay 31. This engages the armatures of relay 31 with contacts 33 and 34, and thus connects lamps 8 and 7, respectively, to the positive terminal of the battery through conductors 35 and 25. Insofar as the operation of flare switch 2 is concerned, it is identical with the operation of flare switch 2 of FIG. 1, the sole difference being that the contacts 23 and 24, instead of being connected to the stop lamp switch, are connected to the terminals of relay 31. Otherwise, the arrangement operates in exactly the same manner as previously described, in that stop or brake lamps 7 and 8 are flashed in alternation when flare switch 2 is moved to the "on" position.

FIGS. 3 and 4 illustrate two embodiments of the invention in which visual warning signals of an emergency stop or emergency parking are provided by concurrent illumination of already existing signal lamp equipment on the vehicle. In each of these embodiments, the "alternating" or oscillating type of flasher 1, such as used in the embodiments of FIGS. 1 and 2, is replaced by an "on-off" type of flasher 36.

Referring first to FIG. 3, the positive terminal of the potential source is connected to "live" terminal 38 of ignition switch 37 and "auxiliaries" terminal 39 of ignition switch 37 is connected, by a conductor 42, to the magnetic core of flasher 36. This flasher differs from flasher 1 in that the movable switch arm 36b engaged with the contact 10 controls only this contact and does not engage any contact 27 when released from engagement with contact 10 by expansion of hot wire 18. A conductor 44 connects conductor 42 to contact or terminal 26 of flare switch 2. One flare signal circuit extends from "park" contact or terminal 41 of ignition switch 37, and includes a conductor 43 connecting contact 41 to contact 24 of flare signal switch 2. The remainder of this flare signal circuit includes contact 26, conductor 44, conductor 42, the core of flasher 36, armature 36b of flasher 36, contact 10, winding 11, and contacts 12 and 23, closed in the "on" position of flare switch 2. From contact 23, this flare signal circuit extends through a normally open switch 45 to the signal lamps 4. Switch 45 is closed whenever the vehicle is parked, and thus may be operated by the usual handbrake, the speedometer shaft, the ignition switch, or the like vehicle control element.

A second flare signal circuit extends from contact 41 of ignition switch 37. This circuit includes a conductor 46 connecting ignition switch terminal 41 to the armature of relay 47 and, when this armature is transferred, to "make" contact 47 of the relay and thus through lamps 5 to ground. In the arrangement illustrated in FIG. 3, all four signal lamps 4 and 5 are flashed substantially in synchronism.

In the arrangement of FIG. 3, contact or terminal 41 of ignition switch 37 is the parking position contact of the ignition switch. This has the advantage that, in the parking position of switch 37, there is no direct connection between the terminal 41, which is now at positive potential, and the terminal 39 except when flare switch 2 is closed. When flare switch 2 is "on," terminal 41 is connected through contacts 24 and 26, conductor 44, flasher 36 and conductor 42 to terminal 39. This is important inasmuch as terminal 39 is connected to other electricity consuming devices in the vehicle in the parking position of the switch 37 but, with flare switch 2 in the "off" position, contacts 24 and 26 are disconnected so that no potential is supplied to terminal 39. Also, contact or terminal 40 of ignition switch 37, which leads to the vehicle ignition, does not have a potential applied thereto.

During normal driving of the vehicle, contact 39 is at positive potential because it is connected by switch 37 to contact 38 which is connected to the ungrounded terminal of the source of potential. Thus, the following circuit is completed: terminal 39, conductor 42, the core of flasher 36, the armature 36b of flasher 36, contact 10, winding or coil 11, contacts 12 and 13 of flare switch 2, conductor 14, and the movable member 3a of turn signal switch 3. Thus, by moving the turn signal selector switch arm 3a in either direction, one or the other of the contacts 15 or 16 is connected to the ungrounded terminal of the battery through flasher 36 and thus either the lamps 4 or the lamps 5, as the case may be, are flashed to indicate a projected turn. If, during such normal driving of the vehicle, flare switch 2 is moved to the "on" position, nothing happens because contact or terminal 41 of ignition switch 31 does not have a potential applied thereto while the vehicle ignition is turned on and, furthermore, switch 45 is open.

However, when the vehicle is parked and ignition switch is turned to the parking position there is a positive potential applied to terminal 41 of ignition switch 37, and contact 12 is disconnected from contact 13 and is connected to contact 23. Also, switch 45 is now closed inasmuch as the vehicle is stationary or parked. Under these circumstances, the following circuit is completed: ungrounded terminal of the source of potential, contacts 38 and 41, conductor 43, contacts 24 and 26, conductor 44, conductor 42, the core of flasher 36, the armature 36b of flasher 36, contact 10, coil 11, contacts 12 and 23, switch 45 and lamps 4 to ground. A parallel circuit extends from contact 23 through relay operating coil 49 to ground, so that relay operating coil 49 is energized to connect contact 47 to conductor 46 which is connected to terminal 41 of ignition switch 37. Thus, lamps 4 are lighted and, in synchronism with such lighting of lamps 4, relay 48 is transferred so that lamps 5 are energized. When, after a predetermined period of current flow through hot wire 18, the flasher movable switch arm 36a disengages contact 10, the potential is removed from terminal 23 so that lamps 4 and 5 are extinguished, with the lamps 5 being extinguished by opening of relay 48. The cycle then repeats with the lamps 4 and 5 being flashed in substantial synchronism with each other and in synchronism with the operation of relay 48.

The automotive vehicle signaling system shown in FIG. 4 differs from that in FIG. 3 in that the relay 48 is replaced by a relay 51 having an operating coil 52 which controls a pair of armatures respectively engageable with "make" contacts 54 and 55. Contact 54 is connected to lamps 5 and contact 55 is connected to lamps 4. In the same manner as in FIG. 3, a pilot lamp 50 is connected between contact 12, of flare switch 2, and conductor 44. In FIG. 4, relay coil 52 is energized over the following circuit extending from contact 12 of flare switch 2: contact 23, switch 45, coil 52 and ground, the contact 23 being connected to contact 12 only in the "on" position of flare switch 2 and the switch 45 being closed only when the vehicle is stationary and parked. A resistance 53 is connected to ground in parallel with relay operating coil 52, and has parameters such that, in conjunction with the parameters of relay winding 52, the resistance of a pair of signal lamps is simulated. The advantage of this arrangement is that the flasher is loaded, during flare signaling, to the same extent as during turn signaling. In the arrangement of FIG. 4, the visual warning signals are provided by the signal lamps 4 and 5 which are flashed in synchronism through the two contacts 54 and 55 of relay 51.

It should be understood that the particular type of flasher used with the signaling systems of the invention is immaterial. Instead of the combined magnetic and hot wire type of flasher illustrated, it is feasible to use either a regular thermal flasher, such as a snap action vane type of flasher, an electronic type of flasher, or a motor driven flasher. Furthermore, the relays 48 and 51 can be replaced by relays having a large number of contacts, which can be closed during flare operation to flash additional existing signal lamp equipment on the vehicle.

While specific embodiments of the invention have been shown and described in detail to illustrate the application of the principles of the invention, it will be understood that the invention may be embodied otherwise without departing from such principles.

What is claimed is:

1. A visual signaling system for automotive vehicles comprising, in combination, a source of electric potential; a first pair of turn signal lamps mounted on the left side of the vehicle and a second pair of turn signal lamps mounted on the right side of the vehicle, each turn signal lamp having one terminal connected to said source; a pair of stop lamps each mounted on a respective opposite side of the vehicle and each having one terminal connected to said source; a relay including an operating coil, a pair of armatures operable by said coil, and a pair of "make" contacts each engaged by a respective armature when said coil is energized; means connecting each of said "make" contacts to a respective stop lamp; a normally open brake pedal operated switch connected in series with said source and the operating coil of said relay whereby, upon application of the vehicle brakes, said relay coil is energized to engage said armatures with the respective "make" contacts to steadily illuminate said brake lamps; a flasher connected to said source; a turn signal selector switch having a pair of output terminals each connected to the turn signal lamps on a respective side of the vehicle, and having an input terminal, and operable to selectively connect either of the right or left side turn signal lamps to said input terminal; a flare signal switch having output terminal means connected to said selector switch, and further output terminal means connected to said brake lamps independently of said selector switch and of said relay armatures; said flare signal switch having a first position connecting its input terminal means solely to the input terminal of said selector switch, and a second position connecting its input terminal means to said brake lamps and disconnecting its input terminal means from said selector switch.

2. A visual signaling system for automotive vehicles comprising, in combination, a source of electric potential; a first pair of turn signal lamps mounted on the left side of the vehicle and a second pair of turn signal lamps mounted on the right side of the vehicle, each turn signal lamp having one terminal connected to said source; a pair of stop lamps each mounted on a respective opposite side of the vehicle and each having one terminal connected to said source; a relay including an operating coil, a pair of movable armatures, and a pair of "make" contacts engaged by said armatures when said relay coil is energized; means connecting said armatures to said source; means connecting each "make" contact to a respective stop lamp; a normally open brake pedal operated switch connected in series with said source and said relay operating coil whereby, upon application of the vehicle brakes, said relay coil is energized to engage said armatures with respective "make" contacts to steadily illuminate said brake lamps; an alternating flasher including a movable switch member connected to said source and alternately engaging first and second output contacts when the flasher is energized; a turn signal selector switch having a pair of output terminals each connected to the turn signal lamps on a respective side of the vehicle, and having an input terminal, and operable to selectively connect either the right or left side turn signal lamps to said input terminal; a flare signal switch having a first input terminal connected to one of said output contacts and a second input terminal connected to the other of said output contacts, a first output terminal connected to the input terminal of said selector switch, and a pair of second output terminals each connected to a respective stop lamp independently of said selector switch and of said relay armatures; said flare signal switch having a first position connecting its first input terminal to the input terminal of said selector switch, and a second position connecting its first input terminal to one of its second output terminals and its second input terminal to the other of its second output terminals and disconnecting its first input terminal from its first output terminal; whereby, in said second position of said flare signal switch, said brake lamps are flashed in alternation.

3. A visual signaling system for automotive vehicles comprising, in combination, a source of electric potential; plural signal lamps mounted on the left side of the vehicle and plural signal lamps mounted on the right side of the vehicle, each lamp having one terminal connected to said source; a flasher connected to said source; a turn signal selector switch having output terminals connected to signal lamps on respective opposite sides of the vehicle and having an input terminal, and operable to selectively connect signal lamps on the right side of the vehicle or signal lamps on the left side of the vehicle to said input terminal; a flare signal switch having input terminal means connected to said flasher, output terminal means connected to said selector switch, and further output terminal means connected to signal lamps on both sides of the vehicle independently of said selector switch; said flare signal switch having a first position connecting its input terminal means solely to the input terminal of said selector switch, and a second position connecting its input terminal means to the signal lamps connected to its output terminal means and disconnecting its input terminal means from said selector switch; and a normally open switch interposed in series with the energizing circuit of said flasher for flare signal operation, and between said flare signal switch and the signal lamps connected thereto; said normally open switch being closed only when the vehicle is parked.

4. A visual-signaling system for automotive vehicles having an ignition switch including a "live" terminal for connection to the vehicle carried source of electric potential, an "auxiliaries" terminal connected to said live terminal in the "on" position of the ignition switch, and a "park" terminal connected to said "live" terminal in the "park" position of said ignition switch, said visual signaling system comprising, in combination, a source of electric potential connected to said live terminal; signal lamps mounted on respective opposite sides of the vehicle and each having one terminal connected to said source; a flasher; a turn signal selector switch having a pair of output terminals connected to signal lamps on respective opposite sides of the vehicle, and having an input terminal, and operable to selectively connect its input terminal to either of its output terminals; a flare signal switch having a first input terminal, a second input terminal, a first output terminal connected to the input terminal of said selector switch, a second output terminal and a third output terminal; a first energizing circuit for said flasher including said auxiliaries terminal of said ignition switch, said flasher, said first input terminal and said first ouptut terminal of said flare switch, and the input terminal of said selector switch; a second energizing circuit for said flasher including said park terminal of said ignition switch, said third output terminal of said flare signal switch, said second input terminal of said flare signal switch, said flasher, and said first input terminal of said flare signal switch; said flare signal switch having a first position connecting its first input terminal to its first output terminal, and a second position connecting its second input terminal to its third output terminal and its first input terminal to its second output terminal and disconnecting its first input terminal from its first output terminal; and circuit means, including relay means connected to said second output terminal of said flare signal switch, effective, in said second position of said flare signal switch, to connect said signal lamps to said park terminal of said ignition switch; said flasher being energized over said first energizing circuit during turn signal operation and being energized over said second energizing circuit during flare signal operation.

5. A visual signaling system for automotive vehicles having an ignition switch including a 'live" terminal for connection to the vehicle carried source of electric potential, an "auxiliaries" terminal connected to said live terminal in the "on" position of the ignition switch, and a "park" terminal connected to said "live" terminal in the "park" position of said ignition switch, said visual signaling system comprising, in combination, a source of electric potential connected to said live terminal; signal lamps mounted on respective opposite sides of the vehicle and each having one terminal connected to said source; a flasher; a turn signal selector switch having a pair of output terminals connected to signal lamps on respective opposite sides of the vehicle, and having an input terminal, and operable to selectively connect its input terminal to either of its output terminals; a flare signal switch having a first input terminal, a second input terminal, a first output terminal connected to the input terminal of said selector switch, a second output terminal and a third output terminal; a first energizing circuit for said flasher including said auxiliaries terminal of said ignition switch, said flasher, said first input terminal and said first output terminal of said flare switch, and the input terminal of said selector switch; a second energizing circuit for said flasher including said park terminal of said ignition switch, said third output terminal of said flare signal switch, said second input terminal of said flare signal switch, said flasher, and said first input terminal of said flare signal switch; said flare signal switch having a first position connecting its first input terminal to its first output terminal, and a second position connecting its second input terminal to its third output terminal and its first input terminal to its second output terminal and disconnecting its first input terminal from its first output terminal; circuit means, including relay means connected to said second output terminal of said flare signal switch, effective, in said second position of said flare signal switch, to connect said signal lamps to said park terminal of said ignition switch; said flasher being energized over said first energizing circuit during turn signal operation and being energized over said second energizing circuit during flare signal operation; and a normally open switch connected in series in said second energizing circuit of said flasher means and closed only when the vehicle is parked.

6. A visual signaling system for automotive vehicles having an ignition switch including a 'live" terminal for connection to the vehicle carried source of electric potential, an "auxiliaries" terminal connected to said live terminal in the "on" position of the ignition switch, and a "park" terminal connected to said "live" terminal in the "park" position of said ignition switch, said visual signaling system comprising, in combination, a source of electric potential connected to said live terminal; signal lamps mounted on respective opposite sides of the vehicle and each having one terminal connected to said source; a flasher; a turn signal selector switch having a pair of output terminals connected to signal lamps on respective opposite sides of the vehicle, and having an input terminal, and operable to selectively connect its input terminal to either of its output terminals; a flare signal switch having a first input terminal, a second input terminal, a first output terminal connected to the input terminal of said selector switch, a second output terminal and a third output terminal; a first energizing circuit for said flasher including said auxiliaries terminal of said ignition switch, said flasher, said first input terminal and said first output terminal of said flare switch, and the input terminal of said flare switch, and the input terminal of said selector switch; a second energizing circuit for said flasher including said park terminal of said ignition switch, said third output terminal of said flare signal switch, said second input terminal of said flare signal switch, said flasher, and said first input terminal of said flare signal switch; said flare signal switch having a first position connecting its first input terminal to its first output terminal, and a second position connecting its second input terminal to its third output terminal and its first input terminal to its second output terminal and disconnecting its first input terminal from its first output terminal; circuit means connecting said second output terminal of said flare signal switch to the signal lamps on one side of the vehicle; and relay means, including an energizing coil connected to said second output terminal of said flare signal switch and operable, in said second position of said flare signal switch, to connect the signal lamps on the opposite side of the vehicle to said park terminal of said ignition switch; said flasher being energized over said first energizing circuit during turn signal operation and being energized over said second energizing circuit during flare signal operation.

7. A visual signaling system for automotive vehicles having an ignition switch including a "live" terminal for connection to the vehicle carried source of electric potential, an "auxiliaries" terminal connected to said live terminal in the "on" position of the ignition switch, a "park" terminal connected to said "live" terminal in the "park" position of said ignition switch, said visual signaling system comprising, in combination, a source of electric potential connected to said live terminal; signal lamps mounted on respective opposite sides of the vehicle and each having one terminal connected to said source; a flasher; a turn signal selector switch having a pair of output terminals connected to signal lamps on respective opposite sides of the vehicle, and having an input terminal, and operable to selectively connect its input terminal to either of its output terminals; a flare signal switch having a first input terminal, a second input terminal, a first output terminal connected to the input terminal of said selector switch, a second output terminal and a third output terminal; a first energizing circuit for said flasher including said auxiliaries terminal of said ignition switch, said flasher, said first input terminal and said first output terminal of said flare switch, and the input terminal of said selector switch; a second energizing circuit for said flasher including said park terminal of said ignition switch, said third output terminal of said flare signal switch, said second input terminal of said flare signal switch, said flasher, and said first input terminal of said flare signal switch; said flare signal switch having a first position connecting its first input terminal to its first output terminal, and a second position connecting its second input terminal to its third output terminal and its first input terminal to its second output terminal and disconnecting its first input terminal from its first output terminal; circuit means connecting said second output terminal of said flare signal switch to the signal lamps on one side of the vehicle; and relay means, including an energizing coil connected to said second output terminal of said flare signal switch and operable, in said second position of said flare signal switch, to connect the signal lamps on the opposite side of the vehicle to said park terminal of said ignition switch; said flasher being energized over said first energizing circuit during turn signal operation and being energized over said second energizing circuit during flare signal operation; said circuit means connecting said second output terminal of said flare signal switch to said signal lamps on one side of the vehicle including a normally open switch in series with said second output terminal of said flare signal switch and closed only when the vehicle is parked.

8. A visual signaling system for automotive vehicles having an ignition switch including a "live" terminal for connection to the vehicle carried source of electric potential, an "auxiliaries" terminal connected to said live terminal in the "on" position of the ignition switch, and a "park" terminal connected to said "live" terminal in the "park" position of said ignition switch, said visual signaling system comprising, in combination, a source of electric potential connected to said live terminal; signal lamps mounted on respective opposite sides of the vehicle and each having one terminal connected to said source; a flasher; a turn signal selector switch having a pair of output terminals connected to signal lamps on respective opposite sides of the vehicle, and having an input terminal, and operable to selectively connect its input terminal to either of its output terminals; a flare signal switch having a first input terminal, a second input terminal, a first output terminal connected to the input terminal of said selector switch, a second output terminal and a third output terminal; a first energizing circuit for said flasher including said auxiliaries terminal of said ignition switch, said flasher, said first input terminal and said first output terminal of said flare switch, and the input terminal of said selector switch; a second energizing circuit for said flasher including said park terminal of said ignition switch, said third output terminal of said flare signal switch; said second input terminal of said flare signal switch, said flasher, and said first input terminal of said flare signal switch; said flare signal switch having a first position connecting its first input terminal to its first output terminal, and a second position connecting its second output terminal to its third output terminal and its first input terminal to its second output terminal and disconnecting its first input terminal from its first output terminal; a relay including an operating coil, a pair of movable armatures, and a pair of "make"

contacts each engageable by a respective armature upon energization of said relay coil; circuit means connecting said relay operating coil to said second output terminal of said flare signal switch; circuit means connecting said armatures to said park terminal of said ignition switch; and circuit means connecting each of said "make" contacts to signal lamps on a respective side of the vehicle; said flasher being energized over its first energizing circuit during turn signal operation and being energized over its said second energizing circuit during flare signal operation.

9. A visual signaling system for automotive vehicles having an ignition switch including a "live" terminal for connection to the vehicle carried source of electric potential, an "auxiliaries" terminal connected to said live terminal in the "on" position of the ignition switch, and a "park" terminal connected to said "live" terminal in the "park" position of said ignition switch, said visual signaling system comprising, in combination, a source of electrical potential connected to said live terminal; signal lamps mounted on respective opposite sides of the vehicle and each having one terminal connected to said source; a flasher; a turn signal selector switch having a pair of output terminals connected to signal lamps on respective opposite sides of the vehicle, and having an input terminal, and operable to selectively connect its input terminal to either of its output terminals; a flare signal switch having a first input terminal, a second input terminal, a first output terminal connected to the input terminal of said selector switch, a second output terminal and a third output terminal; a first energizing circuit for said flasher including said auxiliaries terminal of said ignition switch, sad flasher, said first input terminal and said first output terminal of said flare switch, and the input terminal of said selector switch; a second energizing circuit for said flasher including said park terminal of said ignition switch, said third output terminal of said flare signal switch; said second input terminal of said flare signal switch, said flasher, and said first input terminal of said flare signal switch; said flare signal switch having a first position connecting its first input terminal to its first output terminal, and a second position connecting its second input terminal to its third output terminal and its first input terminal to its second output terminal and disconnecting its first input terminal from its first output terminal; a relay including an operating coil, a pair of movable armatures, and a pair of "make" contacts each engageable by a respective armature upon energization of said relay coil; circuit means connecting said relay operating coil to said second output terminal of said flare signal switch; circuit means connecting said armatures to said park terminal of said ignition switch; and circuit means connecting each of said "make" contacts to the signal lamps on a respective side of the vehicle; said flasher being energized over its first energizing circuit during turn signal operation and being energized over its said second energizing circuit during flare signal operation; said circuit means connecting said relay operating coil to said second output terminal of said flare signal switch including a normally open switch in series with said second terminal of said flare signal switch and closed only when the vehicle is parked.

10. A visual signaling system for automotive vehicles having an ignition switch including a "live" terminal for connection to the vehicle carried source of electric potential, an "auxiliaries" terminal connected to said live terminal in the "on" position of the ignition switch, and a "park" terminal connected to said "live" terminal in the "park" position of said ignition switch, said visual signaling system comprising, in combination, a source of electric potential connected to said live terminal; signal lamps mounted on respective opposite sides of the vehicle and each having one terminal connected to said source; a flasher; a turn signal selector switch having a pair of output terminals connected to signal lamps on respective opposite sides of the vehicle, and having an input terminal, and operable to selectively connect its input terminal to either of its output terminals; a flare signal switch having a first input terminal, a second input terminal, a first output terminal connected to the input terminal of said selector switch, a second output terminal and a third output terminal; first energizing circuit for said flasher including said auxiliaries terminal of said ignition switch, said flasher, said first input terminal and said first output terminal of said flare switch, and the input terminal of said selector switch; a second energizing circuit for said flasher including said park terminal of said ignition switch, said third output terminal of said flare signal switch; said second input terminal of said flare signal switch, said flasher, and said first input terminal of said flare signal switch; said flare signal switch having a first position connecting its first input terminal to its first output terminal, and a second position connecting its second input terminal to its third output terminal and its first input terminal to its second output terminal and disconnecing its first input terminal from its first output terminal; a relay including an operating coil, a pair of movable armatures, and a pair of "make" contacts each engageable by a respective armature upon energization of said relay coil; circuit means connecting said relay operating coil to said second output terminal of said flare signal switch; circuit means connecting said armatures to said park terminal of said ignition switch; and circuit means connecting each of said "make" contacts to signal lamps on a respective side of the vehicle; said flasher being energized over its first energizing circuit during turn signal operations and being energized over its said second energizing circuit during flare signal operation; and a resistance connected in parallel with said relay coil, said resistance and said relay coil conjointly imposing a load on the flasher equal to the load imposed thereupon by the signal lamps on one side of the vehicle.

References Cited

UNITED STATES PATENTS

| 2,458,323 | 1/1949 | Volker | 340—74 |
| 3,008,121 | 11/1961 | Ellithorpe | 340—81 X |
| 3,185,961 | 5/1965 | Du Rocher | 340—74 |
| 3,267,330 | 8/1966 | Almassy | 340—83 X |

FOREIGN PATENTS 916,724    1/1963    Great Britain.

NEIL C. READ, *Primary Examiner.*

I. J. LEVIN, *Assistant Examiner.*